United States Patent
Shima et al.

(10) Patent No.: US 12,451,281 B2
(45) Date of Patent: Oct. 21, 2025

(54) LOAD DRIVE DEVICE AND METHOD FOR CONTROLLING ELECTRONIC CONTROL DEVICE

(71) Applicant: Hitachi Astemo, Ltd., Hitachinaka (JP)

(72) Inventors: Yasuo Shima, Hitachinaka (JP); Yoichiro Kobayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 131 days.

(21) Appl. No.: 18/282,585

(22) PCT Filed: Mar. 4, 2022

(86) PCT No.: PCT/JP2022/009514
§ 371 (c)(1),
(2) Date: Sep. 18, 2023

(87) PCT Pub. No.: WO2022/219965
PCT Pub. Date: Oct. 20, 2022

(65) Prior Publication Data
US 2024/0161956 A1    May 16, 2024

(30) Foreign Application Priority Data
Apr. 12, 2021   (JP) .................... 2021-066959

(51) Int. Cl.
*H01H 47/00*   (2006.01)
*H01F 7/18*    (2006.01)

(52) U.S. Cl.
CPC ......... *H01F 7/1844* (2013.01); *H01F 7/1811* (2013.01); *H01F 2007/1888* (2013.01)

(58) Field of Classification Search
None
See application file for complete search history.

(56) References Cited

U.S. PATENT DOCUMENTS

| | | | | |
|---|---|---|---|---|
| 8,055,460 B2 * | 11/2011 | Rajagopalan | ...... | G01R 31/2829 702/65 |
| 2008/0030917 A1 | 2/2008 | Takahashi et al. | | |

(Continued)

FOREIGN PATENT DOCUMENTS

| | | |
|---|---|---|
| JP | 50-33542 B1 | 10/1975 |
| JP | 7-194175 A | 7/1995 |

(Continued)

OTHER PUBLICATIONS

International Search Report (PCT/ISA/210) issued in PCT Application No. PCT/JP2022/009514 dated Apr. 19, 2022 with English translation (4 pages).

(Continued)

*Primary Examiner* — Stephen W Jackson
(74) *Attorney, Agent, or Firm* — Crowell & Moring LLP (57) ABSTRACT

A load drive device that drives and controls an inductive load based on a PWM signal from a microcomputer is provided, and the load drive device has excellent reliability and responsiveness capable of quickly detecting disconnection of the inductive load. The load drive device includes a microcomputer and a driver circuit that drives an inductive load by a pulse width modulation signal of a constant cycle based on a control command from the microcomputer, in which the driver circuit includes a current monitoring circuit that monitors a current flowing through the inductive load, and a disconnection diagnosis circuit that detects disconnection of the inductive load based on a current value detected by the current monitoring circuit, and the disconnection diagnosis circuit obtains a change amount of a current value detected by the current monitoring circuit, and when the change amount is equal to or less than a predetermined threshold, determines that the inductive load is (Continued)

disconnected and notifies the microcomputer of the disconnection.

13 Claims, 7 Drawing Sheets

(56) References Cited

U.S. PATENT DOCUMENTS

| | | |
|---|---|---|
| 2016/0202305 A1 | 7/2016 | Umeno |
| 2020/0067303 A1 | 2/2020 | Uchida et al. |

FOREIGN PATENT DOCUMENTS

| | | |
|---|---|---|
| JP | 2007-157830 A | 6/2007 |
| JP | 2008-41908 A | 2/2008 |
| JP | 2009-89072 A | 4/2009 |
| JP | 2016-131328 A | 7/2016 |
| JP | 2020-182151 A | 11/2020 |
| WO | WO 2018/193527 A1 | 10/2018 |

OTHER PUBLICATIONS

Japanese-language Written Opinion (PCT/ISA/237) issued in PCT Application No. PCT/JP2022/009514 dated Apr. 19, 2022 with English translation (6 pages).

* cited by examiner

LOAD DRIVE DEVICE AND METHOD FOR CONTROLLING ELECTRONIC CONTROL DEVICE

TECHNICAL FIELD

The present invention relates to a configuration of a load drive device and control thereof, and particularly relates to a technique effective for application to a load drive device mounted on an in-vehicle electronic control device that is required to have high reliability and responsiveness.

BACKGROUND ART

A load drive device of a solenoid actuator (hereinafter, referred to as a solenoid) used in a vehicle automatic transmission or the like receives power supply from a vehicle battery, turns on/off a switching element that controls energization, and controls energization to the solenoid. The load drive device measures a value of a current flowing through the solenoid, and applies feedback to a duty ratio of a pulse width modulation signal (hereinafter, referred to as a PWM signal) for adjusting ON/OFF timing of the switching element, so that a desired current is controlled to flow through the solenoid.

When the disconnection of the solenoid occurs during the operation of the load drive device, the current does not flow in the solenoid, and the device cannot be controlled via the solenoid. In the case of a vehicle automatic transmission, it is expected that appropriate speed change control cannot be performed and stress such as engine blowup and speed change shock is generated.

Therefore, when disconnection of the solenoid occurs, it is necessary to detect the disconnection and quickly switch the device to a safe state.

As a background art of the present technical field, for example, there is a technique such as PTL 1. PTL 1 discloses "a method of measuring a difference between a measured value (monitored current value) of a current flowing through a solenoid and a target current value, or an integral value thereof, and detecting abnormality (disconnection) of the solenoid when the difference is a predetermined threshold or more".

In addition, PTL 2 discloses "a technique for detecting abnormality (disconnection) of a solenoid when a duty ratio of PWM signal to a target current value is out of an expected range".

CITATION LIST

Patent Literature

PTL 1: JP 2009-89072 A
PTL 2: JP 7-194175 A

SUMMARY OF INVENTION

Technical Problem

Figure 7:
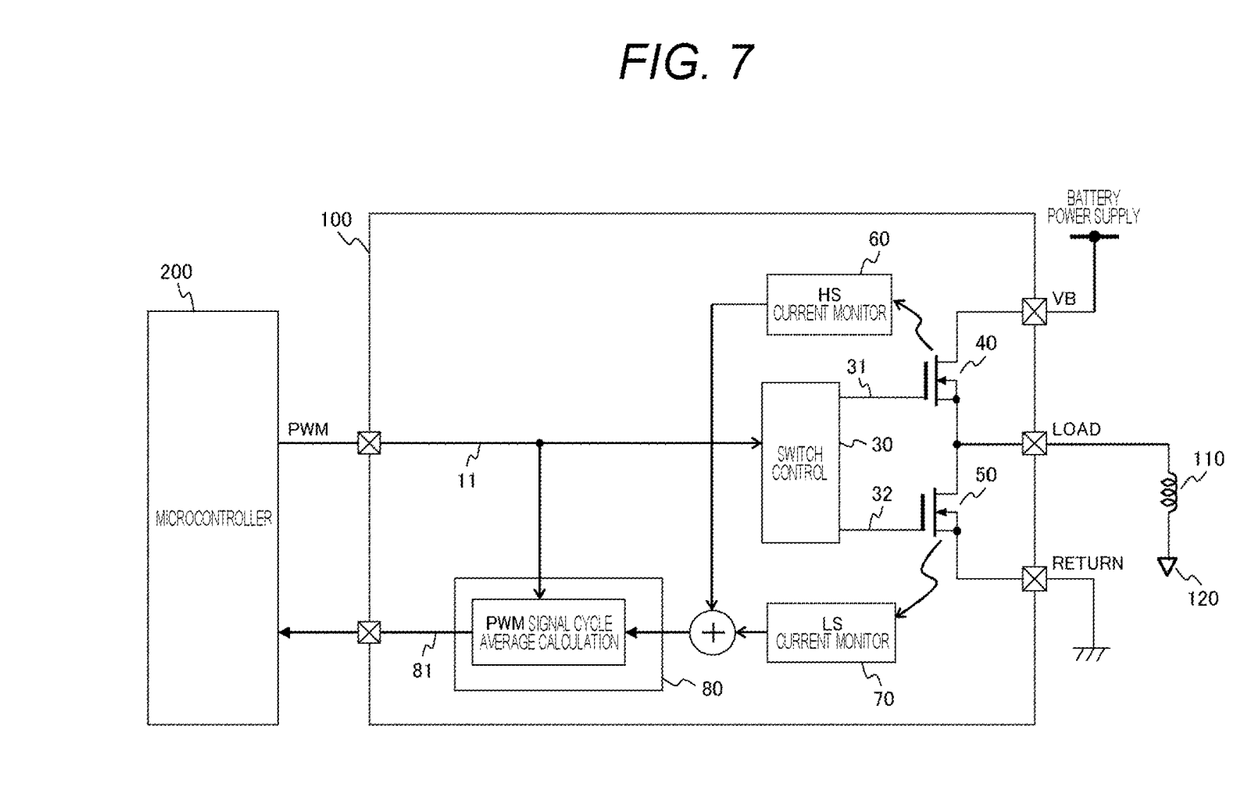
FIG. 7 is a diagram illustrating a schematic configuration of a conventional load drive device.

A problem at the time of solenoid disconnection in the conventional load drive device will be described with reference to FIG. 7. FIG. 7 is a diagram illustrating a schematic configuration of a conventional load drive device.

As illustrated in FIG. 7, in a conventional load drive device (driver circuit 100), one end of a solenoid 110 is connected to a connection point between a high-side switching element 40 and a low-side switching element 50 connected in series to a battery power supply (VB), and the other end of the solenoid 110 is connected to a ground power supply (GND) 120. According to a PWM signal 11 from a microcontroller (hereinafter, sometimes referred to as a microcomputer) 200, the high-side switching element 40 and the low-side switching element 50 are exclusively turned on/off to control a current flowing through the solenoid 110.

When the PWM signal 11 becomes the high level, the high-side switching element 40 is turned on, the low-side switching element 50 is turned off, and a current is supplied from the battery power supply (VB) to the solenoid 110 via the high-side switching element 40.

At this time, since the solenoid 110 is an inductive load, assuming that a voltage of the battery power supply (VB) is VB, an ON resistance of the high-side switching element 40 is Rhon, an inductance of the solenoid 110 is L, and a DC resistance is Rs, and assuming that an initial current flowing through the solenoid 110 is "0" and a time after the high-side switching element 40 is switched to ON is t for simplicity, the current supplied to the solenoid 110 can be approximated by the following Expression (1).

Note that this current is detected and measured by a high-side current monitoring circuit 60.

[Expression 1]

$$VB/(Rhon+Rs)*(1-e^{(-t*(Rhon+Rs)/L)}) \qquad (1)$$

Meanwhile, when the PWM signal 11 becomes a low level, the low-side switching element 50 is turned on, the high-side switching element 40 is turned off, and the current supply from the battery power supply (VB) is interrupted. When the current supply from the battery power supply (VB) is interrupted, a counter electromotive force is generated in the solenoid 110, and a current is supplied from a RETURN ground power supply (GND) through the low-side switching element 50.

Here, when a current value flowing through the solenoid 110 immediately before the low-side switching element 50 is switched to ON is Ipk and a time after the low-side switching element 50 is switched to ON is t, the current supplied to the solenoid 110 can be approximated by the following Expression (2).

Note that this current is detected and measured by a low-side current monitoring circuit 70.

[Expression 2]

$$Ipk*e^{(-t*(Rhon+Rs)/L)} \qquad (2)$$

As described above, since the current flowing through the solenoid 110 basically gradually increases when the PWM signal 11 is at the high level and gradually decreases when the PWM signal 11 is at the low level, an actually measured value with respect to a target current value of the solenoid 110 is evaluated by calculating an average current value 81 of one cycle of the PWM signal by an average current calculation circuit 80 based on the current values detected and measured by the high-side current monitoring circuit 60 and the low-side current monitoring circuit 70.

Therefore, the difference between the measured value (monitored current value) of the current flowing through the solenoid of PTL 1 and the target current value is obtained by acquiring an average current value calculated for each cycle of the PWM signal.

In addition, a duty ratio of the PWM signal with respect to the target current value of PTL 2 is also calculated based on the average current for each cycle of the PWM signal, and thus, the same applies.

When the target current value is large and constant to some extent, the average current in the PWM signal cycle greatly decreases due to the disconnection of the solenoid, and the disconnection can be detected with a delay of one cycle of the PWM signal. However, when the target current value is small, the difference between the monitored current value and the target current value is also small, and it is difficult to detect the disconnection without erroneous detection at the normal time.

In addition, the current of the solenoid does not instantaneously converge in one cycle of the PWM signal, but the current is accumulated in each cycle of the PWM signal, and the current converges to the target current value by repeating feedback of the average current value calculated in each cycle of the PWM signal. In a case where the target current value is changed, when the difference from the original target current value is large, it takes time until the target current value reaches the near current value, so that the disconnection detection is delayed from the viewpoint of preventing erroneous detection.

Therefore, an object of the present invention is to provide a load drive device that drives and controls an inductive load based on a PWM signal from a microcomputer, the load drive device being capable of quickly detecting disconnection of the inductive load and having excellent reliability and responsiveness, and a method for controlling an electronic control device using the load drive device.

Solution to Problem

In order to solve the above problem, according to the present invention, there is provided a load drive device including: a microcomputer; and a driver circuit that drives an inductive load by a pulse width modulation signal of a constant cycle based on a control command from the microcomputer, in which the driver circuit includes a current monitoring circuit that monitors a current flowing through the inductive load, and a disconnection diagnosis circuit that detects disconnection of the inductive load based on a current value detected by the current monitoring circuit, and the disconnection diagnosis circuit obtains a change amount of a current value detected by the current monitoring circuit, and when the change amount is equal to or less than a predetermined threshold, determines that the inductive load is disconnected and notifies the microcomputer of the disconnection.

Further, according to the present invention, there is provided a method for controlling an electronic control device that drives and controls an inductive load based on a PWM signal from a microcomputer, including: monitoring a current flowing through the inductive load; calculating a change amount of the monitored current value; and determining that the inductive load is disconnected when the change amount is equal to or less than a predetermined threshold.

Advantageous Effects of Invention

According to the present invention, in a load drive device that drives and controls an inductive load based on a PWM signal from a microcomputer, it is possible to realize a load drive device that can quickly detect disconnection of the inductive load and has excellent reliability and responsiveness, and a method for controlling an electronic control device using the load drive device.

As a result, it is possible to improve performance and reliability of an in-vehicle electronic control device such as a vehicle automatic transmission.

Problems, configurations, and effects other than those described above will be clarified by the following description of embodiments.

DESCRIPTION OF EMBODIMENTS

Hereinafter, embodiments of the present invention will be described with reference to the drawings. Since the drawings are simplified, the technical scope of the present invention should not be narrowly interpreted based on the description of the drawings. In the description of the present specification, the same elements are denoted by the same reference numerals, and redundant description is omitted.

First Embodiment

Figure 1:
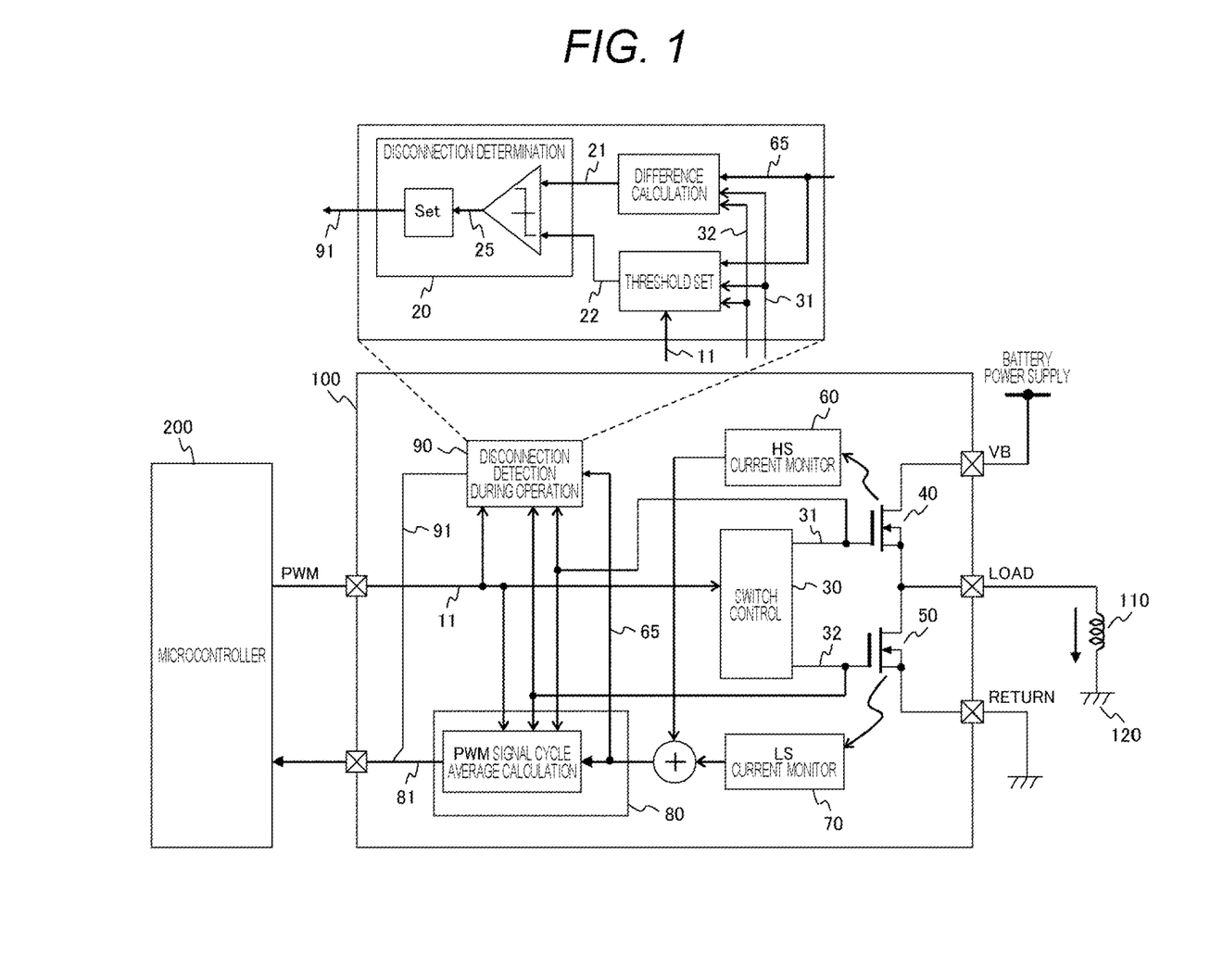
FIG. 1 is a diagram illustrating a schematic configuration of a load drive device according to a first embodiment of the present invention.
Figure 2:
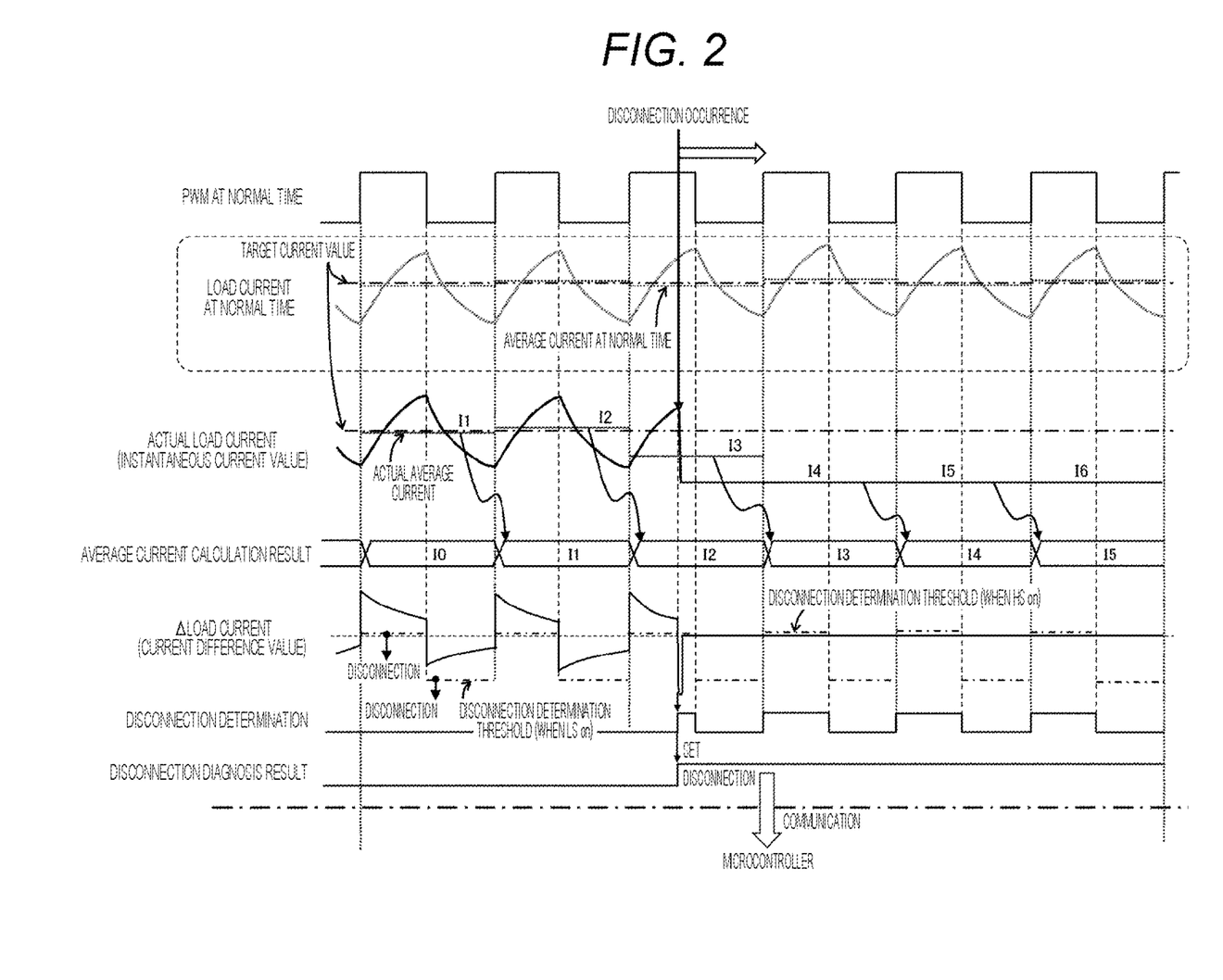
FIG. 2 is a timing chart illustrating an operation of a disconnection diagnosis function according to the first embodiment of the present invention. (Operation Waveform Example 1)
Figure 3:
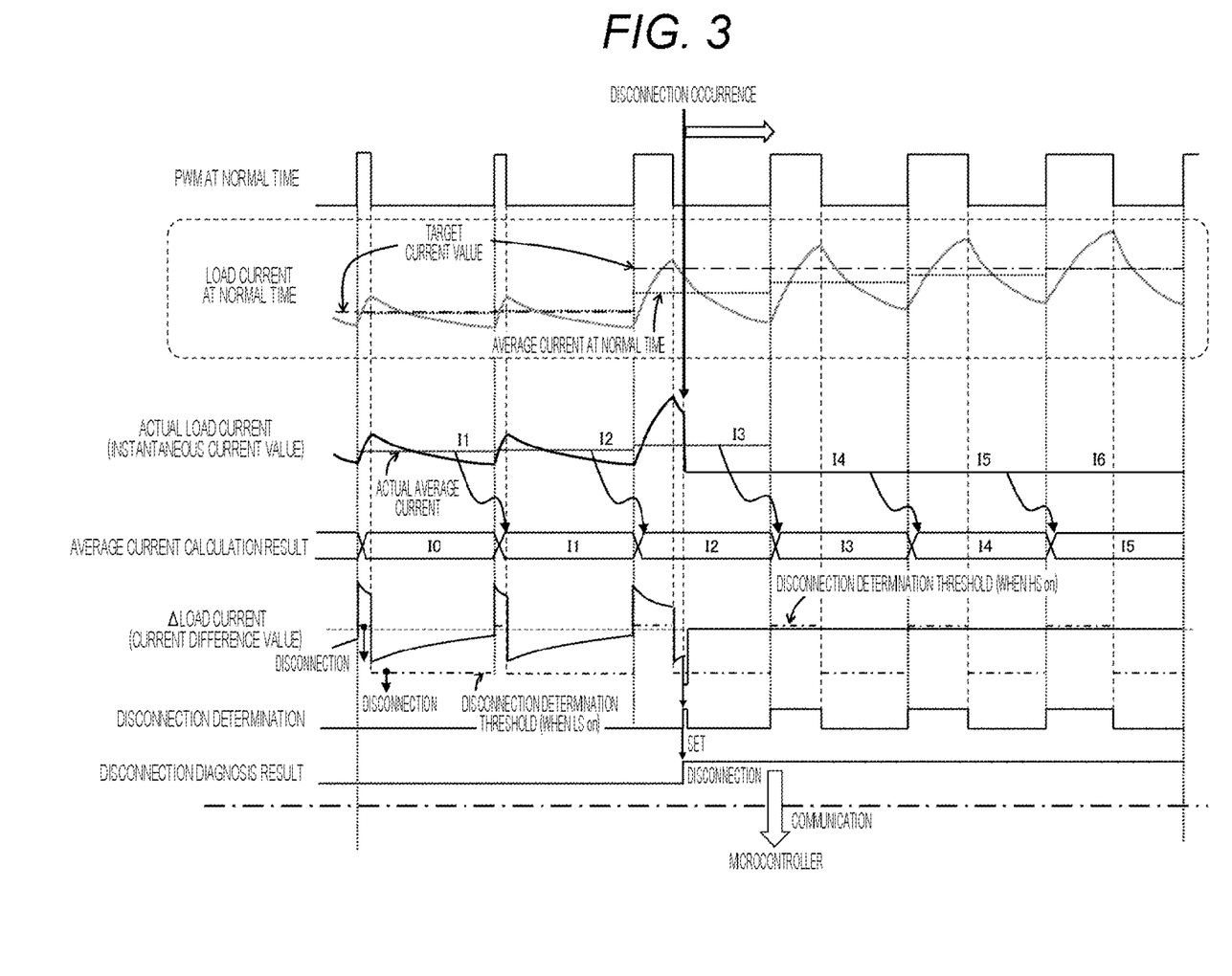
FIG. 3 is a timing chart illustrating the operation of the disconnection diagnosis function according to the first embodiment of the present invention. (Operation Waveform Example 2)
Figure 4:
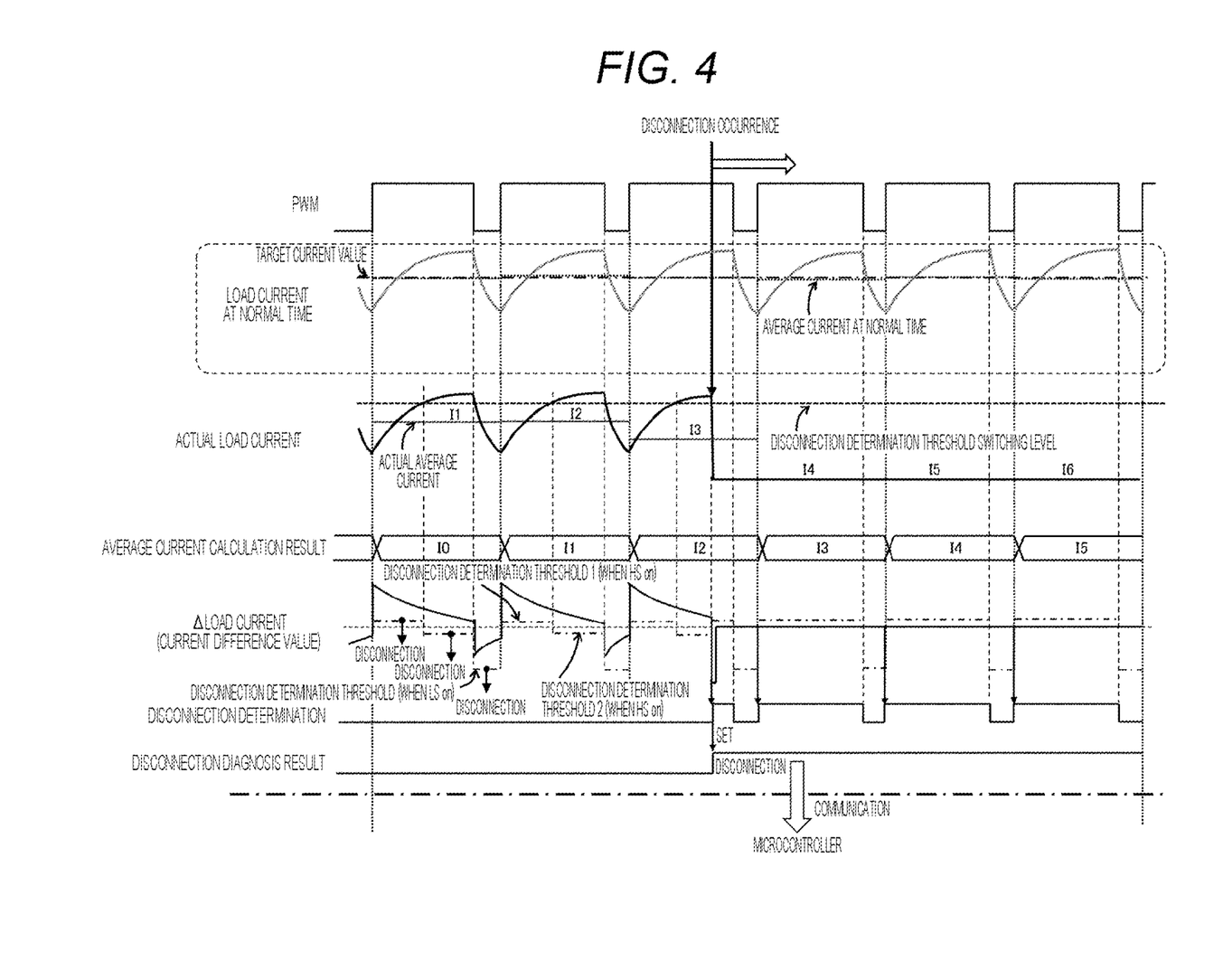
FIG. 4 is a timing chart illustrating the operation of the disconnection diagnosis function according to the first embodiment of the present invention. (Operation Waveform Example 3)

A configuration of a load drive device according to a first embodiment of the present invention and control thereof will be described with reference to FIGS. 1 to 4. FIG. 1 is a diagram illustrating a schematic configuration of a load drive device of the present embodiment. FIGS. 2 to 4 are timing charts illustrating an operation of a disconnection diagnosis function in the present embodiment.

As illustrated in FIG. 1, the load drive device of the present embodiment includes, as main components, a microcomputer 200 and a driver circuit (load drive circuit) 100 that supplies a current to a solenoid 110 that is an inductive load.

Here, for simplification of the drawing, one solenoid 110 and one driver circuit 100 (one set) are illustrated, but the number is not limited.

The driver circuit 100 includes a high-side switching element 40 and a low-side switching element 50 connected in series to a battery power supply (VB). One end of solenoid 110 is connected to a connection point (LOAD) between the high-side switching element 40 and the low-side switching element 50, and a current for driving solenoid 110 is supplied. The other end of the solenoid 110 is connected (grounded) to a ground power supply (GND) 120.

The microcomputer 200 calculates, for example, a current to be supplied to the solenoid 110 necessary for the operation of the vehicle automatic transmission, and outputs a PWM signal 11 for controlling ON/OFF timings of the high-side switching element 40 and the low-side switching element 50 to the driver circuit 100 using the current value as a target current value.

When the PWM signal 11 is at the high level by a switch control circuit 30, the driver circuit 100 that has received the PWM signal 11 generates control signals 31 and 32 so as to turn on the high-side switching element 40 and turn off the low-side switching element 50, and supplies a current from the battery power supply (VB) to the solenoid 110 via the high-side switching element 40.

Meanwhile, when PWM signal 11 is at the low level, the control signals 31 and 32 are generated to turn off the high-side switching element 40 and turn on the low-side switching element 50, so that the current supply from the battery power supply (VB) is interrupted, and the current is supplied from a RETURN ground power supply (GND) to the solenoid 110 via the low-side switching element 50 by a counter electromotive force generated by the interruption of the current.

Although not illustrated in detail, it is assumed that a transition time is required to switch the high-side switching element 40 and the low-side switching element 50 from ON to OFF and from OFF to ON, and thus ON control timing is delayed such that both the high-side switching element 40 and the low-side switching element 50 are not turned on, and a period (hereinafter, referred to as a dead time period) in which both the switching elements 40 and 50 are turned off is added to the control signals 31 and 32.

The current supplied to the solenoid 110 can be increased or decreased by changing the duty ratio of the PWM signal 11, and the current to the solenoid 110 is accurately controlled by measuring the target current value calculated by the microcomputer 200 and the current actually flowing to the solenoid 110 and updating the duty ratio of the PWM signal 11 so that these coincide with each other.

The current flowing through the solenoid 110 is detected and measured by the high-side current monitoring circuit 60 and the low-side current monitoring circuit 70 for each of the high-side switching element 40 and the low-side switching element 50. Based on an instantaneous current value (instantaneous current sampling value) 65 which is the current detection result, an average current calculation circuit 80 calculates an average current value (PWM cycle average current value) 81 of one cycle of the PWM signal, and transfers the average current value to the microcomputer 200.

Here, the sampling frequency of the instantaneous current value (instantaneous current sampling value) 65 used for calculating the PWM cycle average current value 81 is on the order of several MHz to several thousand times with respect to several hundred Hz to several kHz of the assumed PWM signal.

In addition to the above configuration, in the present embodiment, a disconnection diagnosis circuit 90 that performs disconnection diagnosis of the solenoid 110 based on the PWM signal 11, and the instantaneous current value 65 detected and measured by the high-side current monitoring circuit 60 and the low-side current monitoring circuit 70 is installed.

The disconnection diagnosis circuit 90 acquires a difference value (instantaneous current difference value) 21 between samples before and after the instantaneous current value 65 detected and measured by the high-side current monitoring circuit 60 and the low-side current monitoring circuit 70.

Here, the polarity of the instantaneous current difference value 21 is positive (positive direction) when the instantaneous current value 65 increases, and is negative (negative direction) when the instantaneous current value decreases.

Although not illustrated in FIG. 1, when there is a concern of erroneous detection or undetection due to an error of the instantaneous current value 65 due to noise or the like, filter processing such as averaging processing is performed on the instantaneous current value 65 in advance. For example, when the averaging processing is performed every 8 samples for the instantaneous current value 65, the current value difference calculation is also performed for the average value, and the evaluation determination is performed.

In addition, in a dead time period in which ON/OFF of the switching elements 40 and 50 is switched, both the switching elements 40 and 50 are turned off, and current detection and measurement in the high-side current monitoring circuit 60 and the low-side current monitoring circuit 70 may not be stable. Therefore, in the dead time period, a current difference value (instantaneous current difference value) 21 is not acquired (mask), and processing such as excluding disconnection detection is performed.

When the PWM signal 11 is at a high level and the high-side switching element 40 is turned on, the current of the solenoid 110 gradually increases as expressed by the above Expression (1), and thus, at a normal time, the instantaneous current difference value 21 also becomes a positive value equal to or more than a certain value.

However, since the change in the current of the solenoid 110 that gradually increases decreases with the lapse of time of the high level of the PWM signal 11, the instantaneous current difference value 21 may also be in the vicinity of "0" when the duty ratio of the PWM signal 11 is sufficiently large.

Therefore, when the PWM signal 11 is at a high level and the high-side switching element 40 is turned on, a disconnection determination threshold 22 is set in the vicinity of an assumed minimum value "0" of the instantaneous current difference value 21, and a disconnection determination circuit 20 that determines disconnection when the instantaneous current difference value 21 is equal to or less than the disconnection determination threshold 22 is included.

Meanwhile, when the PWM signal 11 is at a low level and the low-side switching element 50 is turned on, the current of the solenoid 110 gradually decreases as expressed by the above Expression (2), and thus, at the normal time, the instantaneous current difference value 21 becomes a negative value equal to or more than a certain value.

However, as the time of the low level of the PWM signal 11 elapses, the change in the current of the solenoid 110 that gradually decreases also decreases. Therefore, when the duty ratio of the PWM signal 11 is sufficiently small, the instantaneous current difference value 21 is also in the vicinity of "0".

Therefore, when the PWM signal 11 is at a low level and the low-side switching element 50 is turned on, the disconnection determination threshold 22 is set to be equal to or smaller than (larger than minus) the minimum value of estimated instantaneous current difference value 21, and the disconnection determination circuit 20 determines that disconnection has occurred when the instantaneous current difference value 21 is equal to or smaller than (larger than minus) the disconnection determination threshold 22. Then, the determination output of the disconnection determination circuit 20 is transferred to the microcomputer 200 as a disconnection diagnosis result 91 of the solenoid 110.

[Operation Waveform Example 1] FIG. 2 illustrates an example of an operation timing chart of the disconnection diagnosis function of the solenoid 110 in the present embodiment. Here, for the sake of simplicity, processing of a signal delay difference and a dead time period is not illustrated. FIG. 2 is an operation timing chart in a case where disconnection of the solenoid 110 occurs in a situation where the current value of the solenoid 110 converges by repeating feedback of the average current value of one cycle of the PWM signal with respect to the target current value of the solenoid 110.

In a normal state, the current (LOAD current in the drawing) of the solenoid 110 repeats gradual increase when the PWM signal 11 is at a high level and gradual decrease when the PWM signal is at a low level, and the instantaneous current difference value 21 (ΔLOAD current in the drawing), which is a change (derivative) of the instantaneous current value 65 in which the current is detected and measured, repeats positive gradual decrease when the PWM signal 11 is at a high level and negative gradual decrease when the PWM signal is at a low level. However, when disconnection of the solenoid 110 occurs, the current of the solenoid 110 rapidly decreases, so that the instantaneous current difference value 21 also rapidly decreases.

FIG. 2 illustrates a case where the disconnection has occurred when the high-side switching element 40 is turned on, but the disconnection determination threshold is equal to or less than the disconnection determination threshold 22 set in the same state, and the disconnection is immediately determined.

[Operation Waveform Example 2]

FIG. 3 illustrates an example of another operation timing chart of the disconnection diagnosis of the solenoid 110 in the present embodiment. Here, similarly to FIG. 2, the processing of the signal delay difference and the dead time period is omitted. When the target current value of the solenoid 110 changes, the feedback of the average current value (PWM cycle average current value) 81 of one cycle of the PWM signal is repeated, so that the duty ratio of the PWM signal 11 changes and the current of the solenoid 110 changes.

Moreover, during this cycle, the current of the solenoid 110 repeats gradual increase when the PWM signal 11 is at a high level, and gradual decrease when the PWM signal is at a low level. The instantaneous current difference value 21 (ΔLOAD current in the drawing), which is a change (derivative) of the instantaneous current value 65 in which the current of the solenoid 110 is detected and measured, repeats a positive gradual decrease when the PWM signal 11 is at the high level and a negative gradual decrease when the PWM signal is at the low level. However, when disconnection of the solenoid 110 occurs, the current of the solenoid 110 rapidly decreases, so that the instantaneous current difference value 21 also rapidly decreases to the negative side.

FIG. 3 illustrates a case where the disconnection has occurred when the low-side switching element 50 is turned on. However, as in FIG. 2, the disconnection determination threshold is equal to or less than a disconnection determination threshold 22 (negative large) set when the low-side switching element 50 is turned on, and the disconnection is immediately determined.

When the disconnection determination is made based on the difference between the target current value and the PWM cycle average current value 81 as in the related art, it is difficult to make the determination when the calculation result of the average current 13 of one cycle of the PWM signal in which the disconnection has occurred is found out.

As described above, in the operation timing chart of the disconnection diagnosis of the solenoid 110 illustrated in FIGS. 2 and 3, one disconnection determination threshold 22 is selected when each of the switching elements 40 and 50 is turned on, but a plurality of disconnection determination thresholds 22 may be installed and switched depending on the instantaneous current value 65 or the current value after the averaging processing for each of the plurality of samples.

When the duty ratio of the PWM signal 11 is low and the current of the solenoid 110 is small, the change in the current gradually increasing at the high level of the PWM signal 11 is large, so that the disconnection determination threshold 22 can be increased. Meanwhile, when the duty ratio of the PWM signal 11 is high and the current of the solenoid 110 is large, the change in the current gradually increasing at the high level of the PWM signal 11 is also small. Therefore, in consideration of avoidance of erroneous detection, the disconnection determination threshold 22 is preferably set to be low "0" or less.

[Operation Waveform Example 3]

FIG. 4 illustrates an example of an operation timing chart of the disconnection diagnosis function of the solenoid 110 when the disconnection determination threshold 22 when the high-side switching element 40 is turned on is switched by the plurality of installed disconnection determination thresholds 22 using the instantaneous current value 65 to perform the disconnection diagnosis. A disconnection determination threshold switching level is set for the instantaneous current value 65, and in a case where the high-side switching element 40 is turned on, when the instantaneous current value 65 is less than the determination threshold switching level, the disconnection determination threshold 22 is set high, and when the instantaneous current value is equal to or greater than the determination threshold switching level, disconnection determination threshold 22 is set low (in the negative direction).

Accordingly, prevention of erroneous detection of disconnection and improvement of detection sensitivity can be expected.

As described above, the disconnection diagnosis of the solenoid 110 according to the present embodiment enables the disconnection detection of the solenoid 110 with less detection delay by a simpler method.

The microcomputer 200 can obtain information on the presence or absence of disconnection of the solenoid 110 through the disconnection diagnosis result 91 of the solenoid 110, and when detecting the disconnection of the solenoid 110, instructs various places to transition the device such as the vehicle automatic transmission to a safe state.

In the case of the vehicle automatic transmission to which the load drive device of the present embodiment is applied, it is possible to quickly transition to a safe shift state, and it is possible to suppress stress such as engine blowup and gear shift shock.

Second Embodiment

Figure 5:
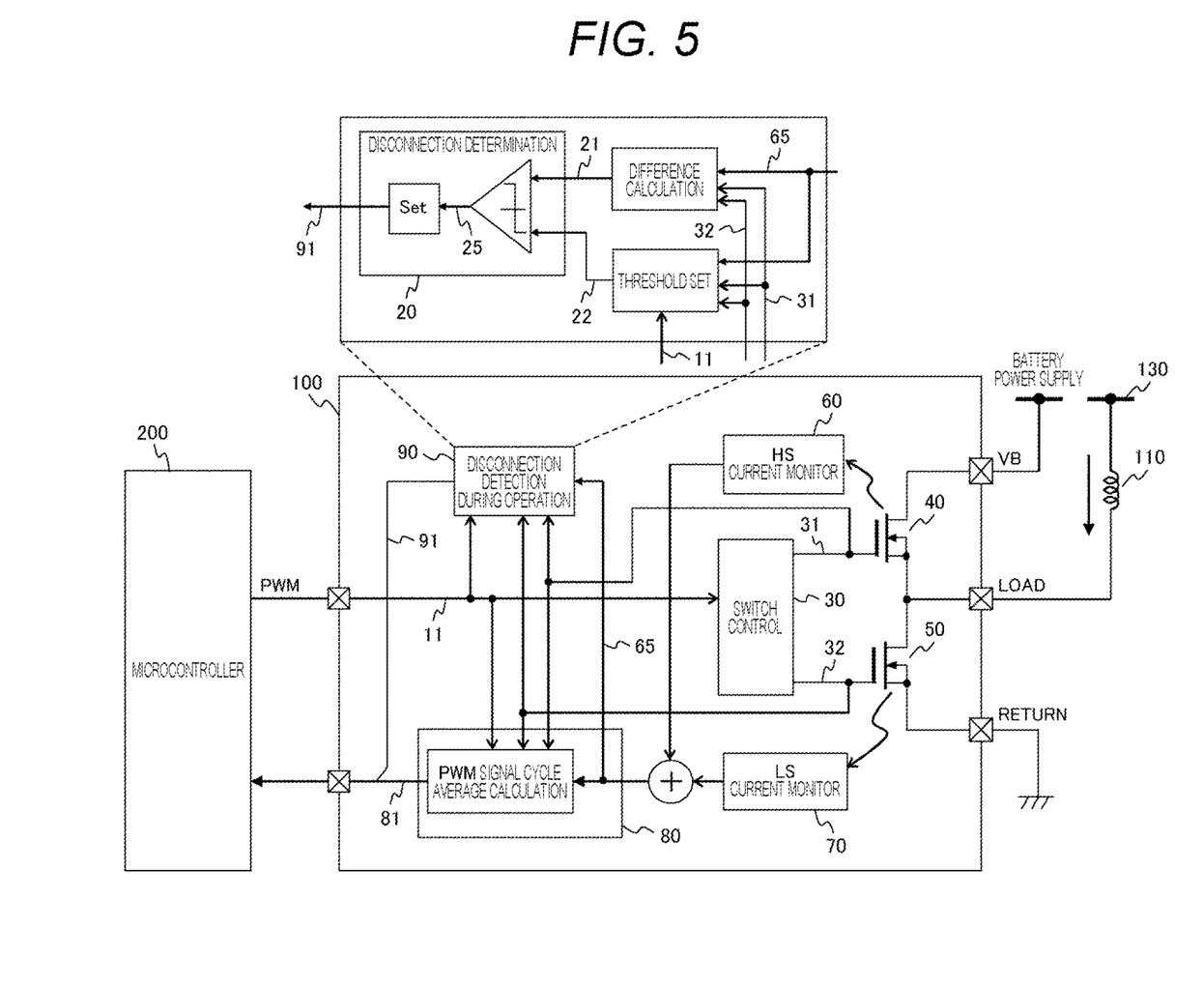
FIG. 5 is a diagram illustrating a schematic configuration of a load drive device according to a second embodiment of the present invention.

A configuration of a load drive device according to a second embodiment of the present invention and control thereof will be described with reference to FIG. 5. FIG. 5 is a diagram illustrating a schematic configuration of a load drive device of the present embodiment, and corresponds to a modification of the first embodiment (FIG. 1).

While the other end of the solenoid 110 connected to the connection point (LOAD) between the high-side switching element 40 and the low-side switching element 50 is connected (grounded) to a ground power supply (GND) 120 in the first embodiment (FIG. 1), the present embodiment (FIG. 5) is different from the first embodiment in that the other end of the solenoid 110 is connected to a solenoid battery power supply 130. Other configurations are similar to those of the first embodiment (FIG. 1).

Even when the other end of the solenoid 110 is connected to the solenoid battery power supply 130 as in the present embodiment, the disconnection of the solenoid 110 with less delay can be detected by the configuration of the disconnection diagnosis circuit 90.

As illustrated in FIG. 5, in the load drive device of the present embodiment, one end of a solenoid 110 is connected to the solenoid battery power supply 130, and a driver circuit 100 that has received a PWM signal 11 for controlling a current flowing through the solenoid 110 from a microcomputer 200 generates control signals 31 and 32 to turn on a low-side switching element 50 and turn off a high-side switching element 40 when the PWM signal 11 is at a high level by a switch control circuit 30, forms a current path from the solenoid battery power supply 130 to a RETURN ground power supply (GND) via the solenoid 110 and the low-side switching element 50, and supplies the current to the solenoid 110.

Meanwhile, when the PWM signal 11 is at a low level, the control signals 31 and 32 are generated to turn on the high-side switching element 40 and turn off the low-side switching element 50, the current path to the RETURN ground power supply (GND) is disconnected, the current is interrupted, and a current is supplied from a battery power supply (VB) to solenoid 110 via high-side switching element 40 by a counter electromotive force generated by the interruption of the current.

As described above, the direction of the current flowing through the solenoid 110 is opposite to that in the configuration of FIG. 1. However, as the operation of the driver circuit 100, only the ON/OFF timings of the high-side switching element 40 and the low-side switching element 50 with respect to the PWM signal 11 are switched, and the current movement of the solenoid 110 is similar.

In view of this, the disconnection diagnosis circuit 90 may process the instantaneous current value 65 detected and measured by a high-side current monitoring circuit 60 and a low-side current monitoring circuit 70.

That is, when the PWM signal 11 is at a high level, the low-side switching element 50 is turned on, and the voltage of the solenoid battery power supply 130 is set to VB, the current of the solenoid 110 gradually increases as illustrated in Expression (1). A disconnection determination circuit 20 may be provided which sets a disconnection determination threshold 22 in the same manner as when the high-side switching element 40 in the configuration of FIG. 1 is turned on, and determines that the disconnection has occurred when a current difference value (instantaneous current difference value) 21, which is a change (derivative) in the instantaneous current value 65, becomes lower than the disconnection determination threshold 22.

In addition, since the high-side switching element 40 is turned on when the PWM signal 11 is at a low level and the current of the solenoid 110 gradually decreases as illustrated in Expression (2), the disconnection determination threshold 22 may be set similarly to when the low-side switching element 50 in the configuration of FIG. 1 is turned on, and the disconnection determination circuit 20 that determines disconnection when the difference value (instantaneous current difference value) 21 is lower than the threshold 22 may be provided.

As described above, by applying the disconnection diagnosis circuit 90 similar to that in FIG. 1, it is possible to detect the disconnection of the solenoid 110 with a small delay also in the present embodiment illustrated in FIG. 5, and when the disconnection of the solenoid 110 occurs, it is possible to quickly transition the device to a safe state.

Third Embodiment

Figure 6:
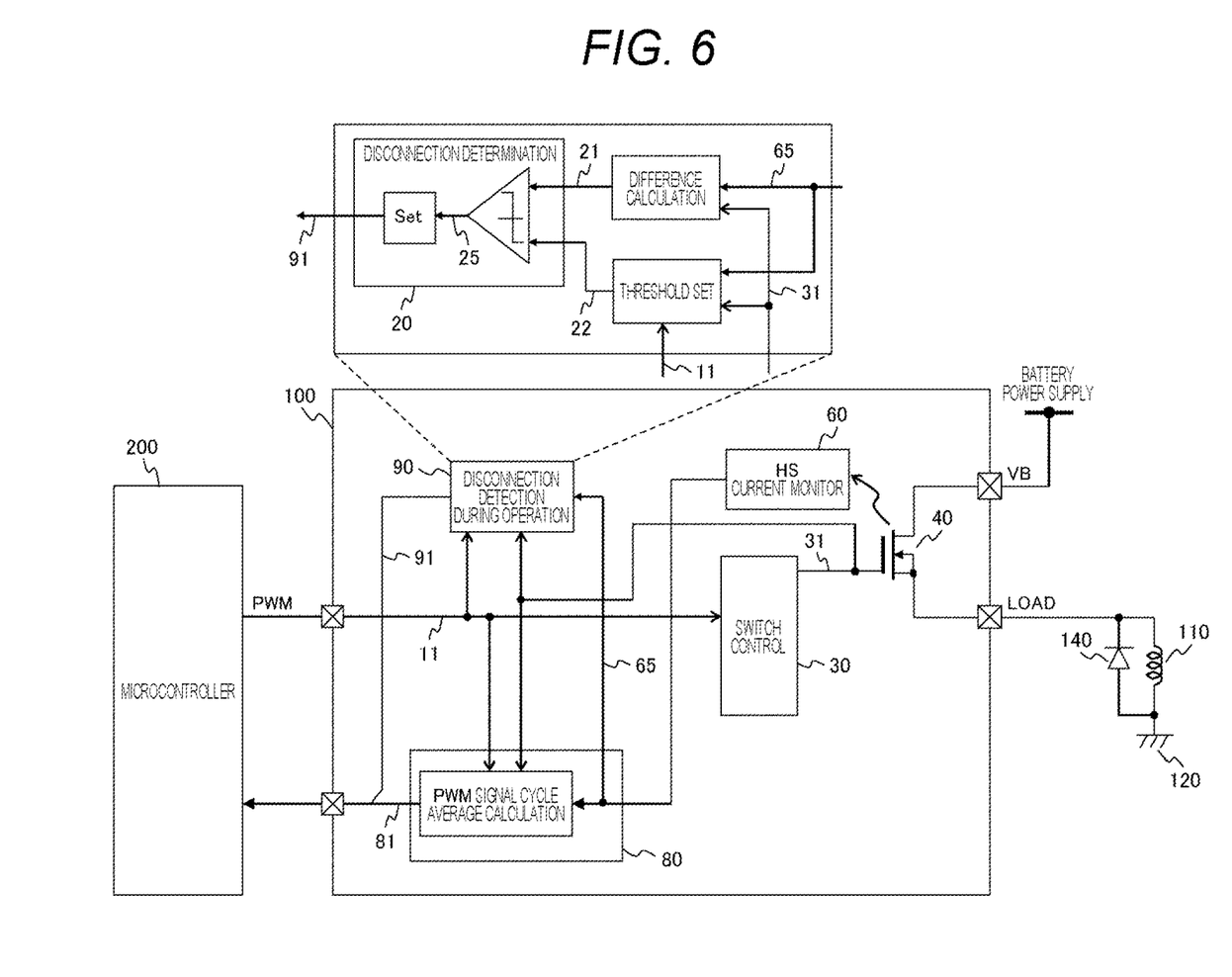
FIG. 6 is a diagram illustrating a schematic configuration of a load drive device according to a third embodiment of the present invention.

A configuration of a load drive device according to a third embodiment of the present invention and control thereof will be described with reference to FIG. 6. FIG. 6 is a diagram illustrating a schematic configuration of the load drive device of the present embodiment.

In the first embodiment (FIG. 1) and the second embodiment (FIG. 5), the driver circuit 100 is a so-called synchronous rectification system in which the high-side switching element 40 and the low-side switching element 50 are turned on and off so as to be substantially complementary to each other and a current is supplied to the solenoid 110.

For example, when the other end of the solenoid 110 connected to the connection point (LOAD) of the driver circuit 100 is connected (grounded) to the ground power supply (GND) 120 as illustrated in FIG. 1, it is also conceivable to omit the low-side switching element 50 and perform rectification with the diode 140 installed in parallel with the solenoid 110 as in the present embodiment (FIG. 6).

In the present embodiment, when a PWM signal 11 is at a high level, a high-side switching element 40 is turned on, and a current is supplied from a battery power supply (VB) to a solenoid 110 via a high-side switching element 40.

Meanwhile, when the PWM signal 11 is at a low level, the high-side switching element 40 is turned off to interrupt current supply from the battery power supply (VB), and a counter electromotive force is generated by the interruption of the current. The generated counter electromotive force applies a forward bias to a diode 140 installed in parallel with the solenoid 110, and a current is supplied from the ground power supply (GND) 120.

In the load drive device of the present embodiment, since the current through the diode 140 when the PWM signal 11 is at the low level is out of detection and measurement, the current is limited to when the PWM signal 11 is at the high level and the high-side switching element 40 is turned on. However, similarly to the example of the operation timing chart of the disconnection diagnosis of the solenoid 110 in the first embodiment illustrated in FIGS. 2 and 4, the disconnection of the solenoid 110 can be detected with a small delay from the occurrence of the disconnection of the solenoid 110, and when the disconnection of the solenoid 110 occurs, the device can immediately transition to a safe state.

When the disconnection of the solenoid 110 occurs when the PWM signal 11 is at the low level, the disconnection detection of the solenoid 110 in the PWM signal cycle is disabled. However, when the disconnection continues, when the PWM signal becomes at the high level in the next cycle, there is almost no change in the current of the solenoid 110, so that the disconnection can be detected by the disconnection diagnosis circuit 90.

Note that the present invention is not limited to the above-described embodiments, and includes various modifications. For example, the above-described embodiments have been described in detail for easy understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and substitute other configurations to, from, and for a part of the configuration of each embodiment.

In addition, control lines and signal lines that are considered to be necessary for the description are illustrated, and all the control lines and signal lines in the product are not necessarily illustrated.

REFERENCE SIGNS LIST

11 PWM signal
20 disconnection determination circuit
21 instantaneous current difference value
22 disconnection determination threshold
30 switch control circuit
31 (high-side switching element on/off) control signal
32 (low-side switching element on/off) control signal
40 high-side switching element
50 low-side switching element
60 high-side current monitoring circuit
65 instantaneous current value (instantaneous current sampling value)
70 low-side current monitoring circuit
80 average current calculation circuit
81 PWM cycle average current value
90 disconnection diagnosis circuit
91 disconnection diagnosis result
100 driver circuit (load drive circuit)
110 solenoid
120 ground power supply (GND)
130 solenoid battery power supply
140 diode
200 microcontroller (microcomputer)

The invention claimed is:

1. A load drive device comprising:
a microcomputer; and
a driver circuit that drives an inductive load by a pulse width modulation signal of a constant cycle based on a control command from the microcomputer, wherein
the driver circuit includes
a current monitoring circuit that monitors a current flowing through the inductive load, and
a disconnection diagnosis circuit that detects disconnection of the inductive load based on a current value detected by the current monitoring circuit, and
the disconnection diagnosis circuit obtains a change amount of a current value detected by the current monitoring circuit, and when the change amount is equal to or less than a predetermined threshold, determines that the inductive load is disconnected and notifies the microcomputer of the disconnection, wherein
the disconnection diagnosis circuit obtains the change amount from a current sampling value sampled in a cycle shorter than one cycle of the pulse width modulation signal of the constant cycle.

2. The load drive device according to claim 1, wherein the change amount is obtained from a front-back difference value of the current sampling value.

3. The load drive device according to claim 1, wherein the disconnection diagnosis circuit acquires an average value for each predetermined number of samples of a current sampling value sampled in a cycle shorter than one cycle of the pulse width modulation signal of the constant cycle, and obtains the change amount from a front-back difference value of the average value.

4. The load drive device according to claim 3, wherein a cycle of acquiring the average value for each predetermined number of samples is shorter than the cycle of the pulse width modulation signal of the constant cycle for controlling the driver circuit.

5. The load drive device according to claim 1, wherein a value of the predetermined threshold is switched with a change in polarity of the pulse width modulation signal of the constant cycle.

6. The load drive device according to claim 1, wherein a value of the predetermined threshold is switched in accordance with a current value detected by the current monitoring circuit.

7. The load drive device according to claim 1, wherein
the inductive load is a solenoid of a vehicle automatic transmission, and
the microcomputer controls the vehicle automatic transmission by a solenoid of a path different from the solenoid in which the disconnection is detected when receiving the notification of the disconnection detection of the solenoid from the disconnection diagnosis circuit.

8. The load drive device according to claim 1, wherein
the driver circuit includes a high-side switching element and a low-side switching element connected in series to a battery power supply, and
one end of the inductive load is connected to a connection point between the high-side switching element and the low-side switching element, and another end is connected to a ground power supply.

9. The load drive device according to claim 1, wherein
the driver circuit includes a high-side switching element and a low-side switching element connected in series to a battery power supply, and
one end of the inductive load is connected to a connection point between the high-side switching element and the low-side switching element, and another end is connected to another battery power supply different from the battery power supply.

10. The load drive device according to claim 1, wherein
the driver circuit includes a high-side switching element connected to a battery power supply, and
one end of the inductive load is connected to another terminal different from a connection terminal between the high-side switching element and the battery power supply, and another end is connected to a ground power supply and has a diode connected in parallel to the inductive load.

11. A method for controlling an electronic control device that drives and controls an inductive load based on a PWM signal from a microcomputer, comprising:
monitoring a current flowing through the inductive load;
calculating a change amount of the monitored current value;
determining that the inductive load is disconnected when the change amount is equal to or less than a predetermined threshold; and
obtaining, using a disconnection diagnosis circuit, the change amount from a current sampling value sampled in a cycle shorter than one cycle of the PWM signal of the constant cycle.

12. The method for controlling an electronic control device according to claim 11, wherein the change amount is obtained from a front-back difference value of a current sampling value.

13. The method for controlling an electronic control device according to claim 11, further comprising acquiring an average value for each predetermined number of samples of a current sampling value sampled in a cycle shorter than one cycle of the PWM signal, and calculating the change amount from a front-back difference value of the average value.

* * * * *